United States Patent [19]

Yamagata

[11] Patent Number: 4,700,444

[45] Date of Patent: Oct. 20, 1987

[54] METHOD FOR MAKING A COMPOSITE ENGINE CYLINDER BLOCK WITH PREFORMED LINER

[75] Inventor: Hiroshi Yamagata, Iwata, Japan

[73] Assignee: Yamaha Hatsudoki Kabushiki Kaisha, Japan

[21] Appl. No.: 807,534

[22] Filed: Dec. 11, 1985

Related U.S. Application Data

[63] Continuation-in-part of Ser. No. 704,535, Feb. 25, 1985, Pat. No. 4,637,110.

[30] Foreign Application Priority Data

| | | | |
|---|---|---|---|
| Dec. 14, 1984 | [JP] | Japan | 59-262822 |
| Dec. 21, 1984 | [JP] | Japan | 59-268452 |
| Dec. 21, 1984 | [JP] | Japan | 59-268453 |

[51] Int. Cl.$^4$ ........................ B23P 15/00; B22D 19/00

[52] U.S. Cl. ........................... 29/156.4 WL; 29/33 C; 29/33 T; 29/529.5; 29/DIG. 5; 123/193 C; 164/98

[58] Field of Search ............... 29/156.4 R, 156.4 WL, 29/412, 525, 527.5, DIG. 5, DIG. 26, 33 C, 33 D, 33 T; 164/97, 98; 123/193 C; 83/191

[56] References Cited

U.S. PATENT DOCUMENTS

| | | | |
|---|---|---|---|
| 1,521,866 | 1/1925 | Carlson | 83/191 X |
| 3,069,209 | 12/1962 | Bauer | 29/156.4 WL |
| 3,259,003 | 7/1966 | Griffin | 83/191 X |
| 4,003,422 | 1/1977 | Schramm et al. | 164/98 |

FOREIGN PATENT DOCUMENTS

| | | | |
|---|---|---|---|
| 43233 | 3/1980 | Japan | 29/156.4 WL |
| 759768 | 10/1956 | United Kingdom | 83/191 |

*Primary Examiner*—P. W. Echols
*Assistant Examiner*—Ronald S. Wallace
*Attorney, Agent, or Firm*—Ernest A. Beutler

[57] ABSTRACT

A method and apparatus for making engine cylinders comprising the steps of punching cylindrical tubes with openings from the inside to the outside and then surrounding the thus formed tubes with a different body of material. In accordance with the method, the punching apparatus includes a mandrel that slidably supports the dies and a backup die that includes a slug ejecting punch which serves the dual function of ejecting the slugs from the backup die and also retracting the punches. In one embodiment of the invention, the port openings are formed smaller than the final configuration and the surrounding material is cast in place and extends into the liner opening for interlocking the surrounding material to the liner.

6 Claims, 13 Drawing Figures

METHOD FOR MAKING A COMPOSITE ENGINE CYLINDER BLOCK WITH PREFORMED LINER

CROSS-REFERENCE TO RELATED APPLICATION

This application is a continuation-in-part of my application "Composite Cylinder Black And Method Of Making It", Ser. No. 704,535, filed Feb. 25, 1985 and assigned to the assignee of this application, now U.S. Pat. No. 4,637,110 issues Jan. 20, 1987.

BACKGROUND OF THE INVENTION

This invention relates to a method for making an engine cylinder and more particularly to an improved method for making a composite cylinder having a liner and surrounding material formed from different metals.

As noted in my aforenoted copending application, it has been the practice to form cylinders from liners made from cast iron or the like with a surrounding cylinder block formed from a light weight metal such as aluminum or an aluminum alloy. Although this construction is highly satisfactory, there are certain difficulties in forming the cast iron liner, particularly where the device is used as a two cycle engine and ports must extend through the liner. It has previously been the practice to form the liner from a flat sheet and the ports are stamped into this flat sheet. The sheet is then rolled into a cylindrical shape and is joined, as by welding, so as to form the completed liner. Such a method has a number of disadvantages, as is noted in my aforenoted copending application.

In my aforenoted application, the liner is made from a cylindrical pipe section and the port openings are formed by punching openings in the liner. Although this has many advantages and overcomes the disadvantages of the prior art constructions, there still can be improvements made in the manner in which the port openings are punched. It is, therefore, a primary object of this invention to provide an improved method for forming the port openings in a cylindrical liner section.

It is yet a further object of this invention to provide an improved punching process for forming openings in a cylindrical liner that can be utilized as the cylinder liner for an internal combustion engine of the two-cycle type.

It is also another object of the invention to provide an improved composite cylinder construction.

SUMMARY OF THE INVENTION

A first feature of the invention is adapted to be embodied in a method of making a composite cylinder block for an internal combustion engine comprising forming a cylinder liner from a cylindrical pipe section, forming at least one port opening in the cylinder liner by punching the opening from the inner diameter of the cylindrical pipe section to its outer diameter and fixing the cylinder liner in a block of different material.

Another feature of the invention is adapted to be embodied in a method for forming openings in cylindrical pipe sections. The method includes the steps of placing a cylindrical pipe section on a mandrel that movably supports at least one punch. A backup die having a knockout and return punch is brought into engagement with the outer circumference of the liner and a punch opening is formed in the liner from its inside to its outside by the mandrel supported punch. The backup die is retracted and the slug forming the opening is removed by retension of the knockout punch. The knowkout unch is then brought into engagement with the mandrel for urging the punch that formed the opening back into place so that the liner may be removed.

Another feature of the invention is adapted to be embodied in a composite cylinder block for an engine or the like having a liner formed with at least one port opening. A block of material is cast in place around the liner and forms a port that cooperates with the opening. The cast material extends into the opening so as to interlock the liner to the cast material.

DETAILED DESCRIPTION OF THE PREFERRED EMBODIMENTS

Figure 1:
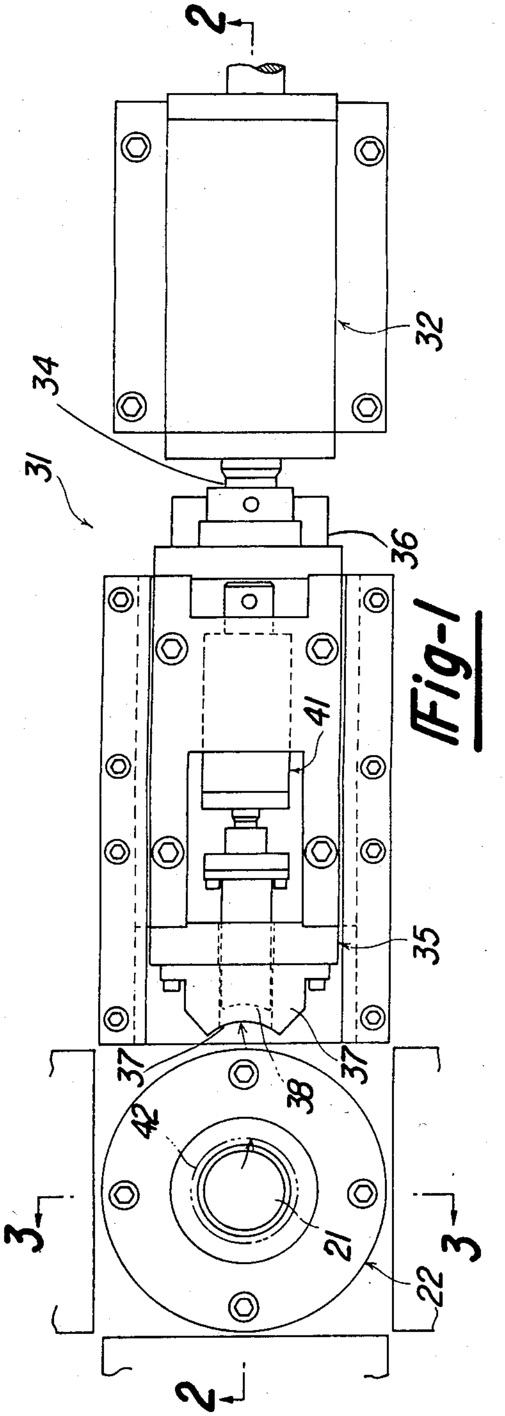
FIG. 1 is a top plan view of a punching apparatus adapted to be utilized in conjunction with performing the method of the invention.

The invention relates to a method for making composite cylinder assemblies for two-cycle internal combustion engines having a cylindrical cylinder liner and a surrounding supporting body, generally formed from a lighter weight material than the liner. Normally the liner will be formed from cast iron and the surrounding material will be an aluminum alloy preferably one having a larger silicon content such as about 10% by weight. Ports are formed through the cylinder liner and the surrounding material which function as the exhaust and/or intake ports of the engine. In FIGS. 1 through 8, there is shown the apparatus for forming the openings in the cylinder liner and reference will now be made to these figures in particular.

A mandrel, indicated by the reference numeral 21 and having a generally cylindrical shape, is supported so that its axis extends in a generally vertical direction. The mandrel 21 has a base 22 upon which a supporting ring 23 is positioned surrounding the lower end of the mandrel 21. The base 22 is, in turn, affixed to a machine supporting plate 24.

The mandrel 21 is provided with a cylindrical bore or opening 25 in which a pull rod 26 is supported for reciprocation. The pull rod is affixed at its lowr end to a piston of an actuating cylinder (not shown) that is mounted beneath the plate 24 and which is operative to effect reciprocation of the pull rod 26.

One or more punches 27 are slidably supported within radially extending openings 28 formed in the mandrel 21 extending from its outer surface to its bore 25. The punches 27 have a configuration corresponding to the shape of the port openings to be formed in the cylinder liner as well as a location which corresponds to the relative location of the desired port opening. In the illustrated embodiment, the punches 27 are disposed along perpendicular planes which intersect at the cylinder bore axis of the resulting cylinder. It is to be understood that any desired configuration or angular relationship may be chosen. In addition, some of the punches 27 may be disposed so that they extend beyond the ends of the cylinder liner since some of the port openings actually will extend through the lower edge of the cylinder liner.

Figure 3:
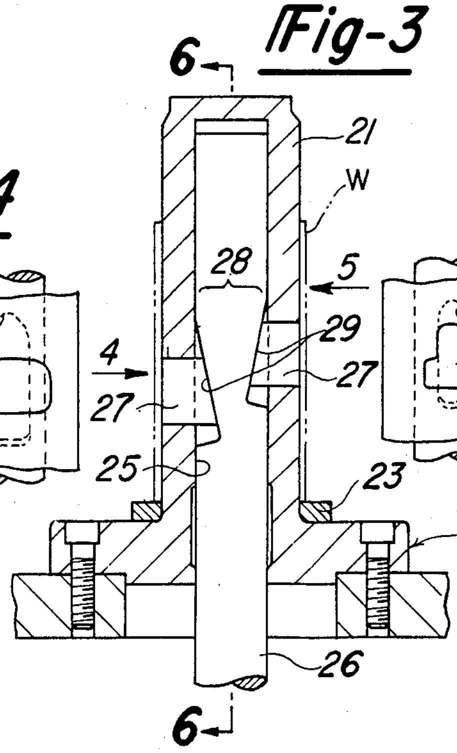
FIG. 3 is an enlarged cross-sectional view taken along the line 3—3 of FIG. 1.
Figure 4:
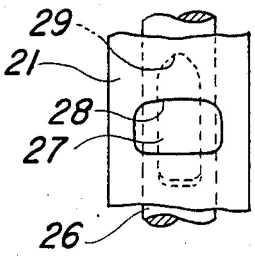
FIG. 4 is a view taken in the direction of the arrow 4 in FIG. 3.
Figure 5:
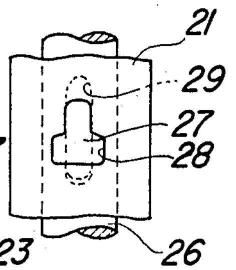
FIG. 5 is a view taken in the direction of the arrow 5 in FIG. 3.
Figure 6:
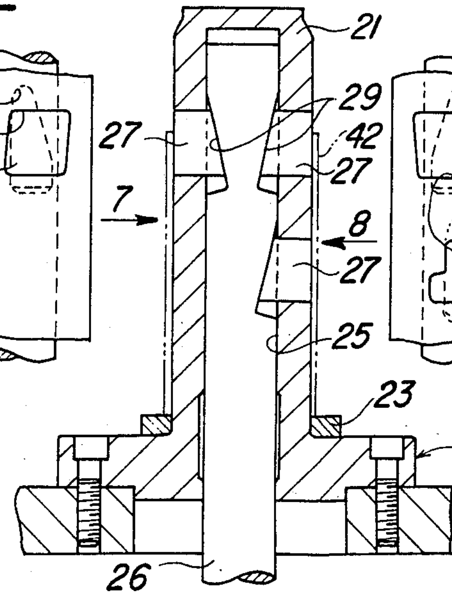
FIG. 6 is a view taken in the direction of the line 6—6 of FIG. 3.
Figure 7:
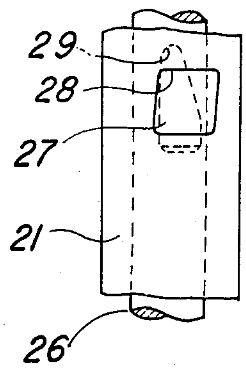
FIG. 7 is a view taken in the direction of the arrow 7 in FIG. 3.
Figure 8:
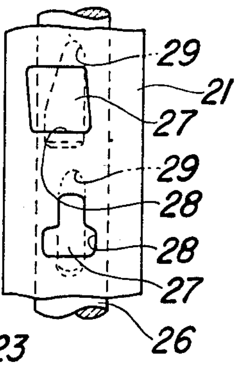
FIG. 8 is a view taken in the direction of the arrow 8 in FIG. 3.

The pull rod 26 is provided with a plurality of inclined cam surfaces 29 each of which is adapted to cooperate with a respective one of the punches 27. The punches 27 all have similarly inclined rearward faces on their back edges which are in engagement with the pull rod inclined surfaces 29. FIGS. 3 throug 8 show the mechanism in a restracted position. As the pull rod 26 moves downwardly, the inclined surfaces 29 will urge the punches 27 outwardly. It should be noted that the inclinations and axial relationship is such that not all punches 27 will be operated simultaneously. The punches 27 are, rather, operated in sequence so as to minimize the loading on the cylinder liner and to avoid damage to it during the punching operation. It should also be noted that downward movement of the pull rod 26 will effect outward movement of the punches 27 but that when the pull rod 26 is returned to its uppermost position, that the punches 27 will not be retracted. The mechanism is too compact to permit a convenient retraction mechanism within it and for this purpose a retraction mechanism, now to be desscribed, is provided.

Figure 2:
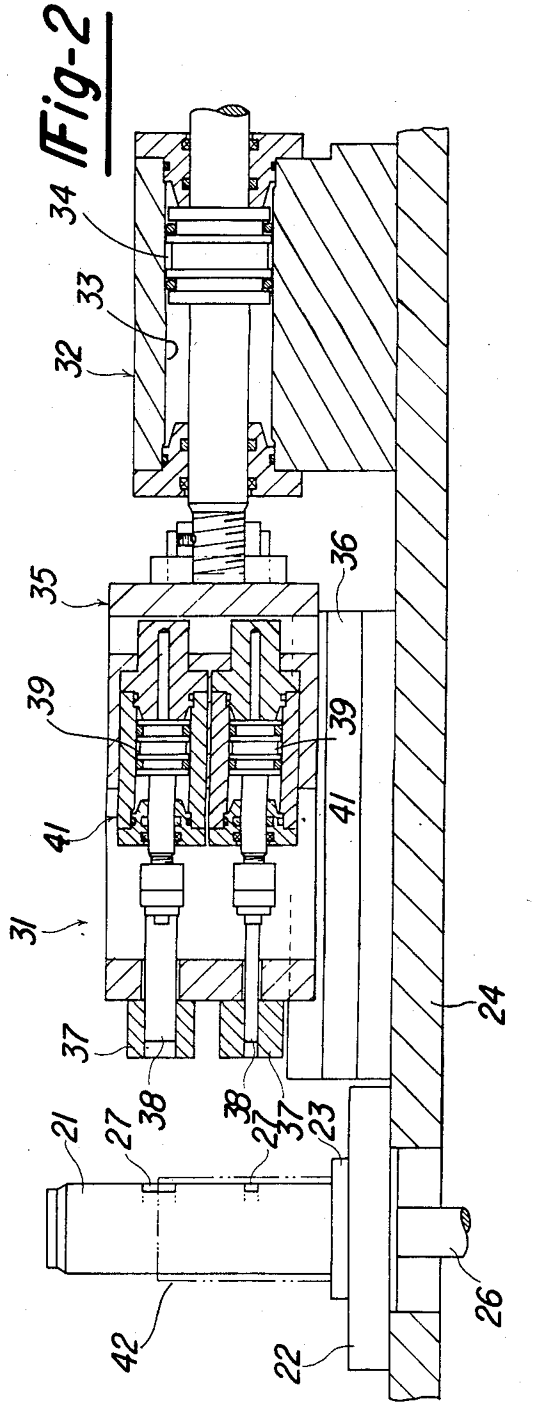
FIG. 2 is a side elevational view, with portios shown in section, of the punching apparatus taken generally along the line 2—2 of FIG. 1.

Referring now primarily to FIGS. 1 and 2, there is associated with each set of circumferentially spaced punches 27 a combined die, slug ejector, and punch return mechanism, indicated generally by the reference numeral 31. The mechanism 31 includes a first cylinder unit 32 that is supported on the plate 24 and includes a cylinder 33 in which a fluid actuated piston 34 is supported. The piston 34 is, in turn, adjustably connected to a die knockout tool base assembly 35 which is, in turn, slidably supported on the plate 24 by a way assembly 36. Dies 37 are formed at the outer periphery of the assembly 35 and are configured so as to provide a cylindrical surface that will engage the outer surface of the cylinder liner and which define the die openings. Slidably supported within these die openings are slug extracting and punch retracting punches 38. The punches 38 are connected to pistons 39 of fluid motors 41 so as to effect reciprocation of the punches 38.

The operation of the punching apparatus will now be described. The figures all show the apparatus in its retracted position. In this position, a workpiece in the form of a section of pipe or tubing which is preferably formed from cast iron and which is indicated by the reference numeral 42 is positioned over the mandrel 21 and in engagement with the support ring 23. It should be noted that the angular or circumferential positioning of the liner 42 on the mandrel 21 is not important. The cylinder assembly 32 is then actuated by urging the piston rod 34 outwardly so as to move the entire assembly 35 into engagement with the workpiece 42 and specifically so that the arcuate faces of the dies 37 engage the outer circumference of the workpiece 42 and are aligned with the respective punches 27.

When the outer periphery of the workpiece 42 is thus supported, the pull rod 26 is urged downwardly so as to cause the punches 27 to move outwardly in sequence and form the respective port openings. The slugs of metal removed by this punching operation will pass into the die openings since the punches 38 are retracted. With the punches 27 still extended, the fluid motor 32 is actuated so as to retract the assembly 35 away from the workpiece 42. The fluid motors 41 are then actuated so that their pistons 39 move their punches 38 outwardly so as to eject the slugs from the die openings. During this time, the pull rod 26 may be activated so as to return it to its home position. This movement will not, however, cause retraction of the punches 27 for the reasons previously noted.

The fluid motor 32 is then again activated while the punches 38 are still extended so that the punches 38 will engage the punches 27 and urge the punches 27 back to their home position. The fluid motors 32 and 41 are then both activated so as to return the assembly 35 to its hoem positon and to retract the punches 38. The workpiece 42 may then be removed.

It should be readily apparent from the foregoing description that the apparatus is extremely compact and yet permits convenient punching of the port openings from the inner diameter to the outer diameter of the cylinder liner. The remaining figures show how the cylinder liner may be incorporated into a finished cylinder assembly and two such embodiments are illustrated, one being in FIGS. 9 through 11 and the other being in FIGS. 12 and 13.

Figure 9:
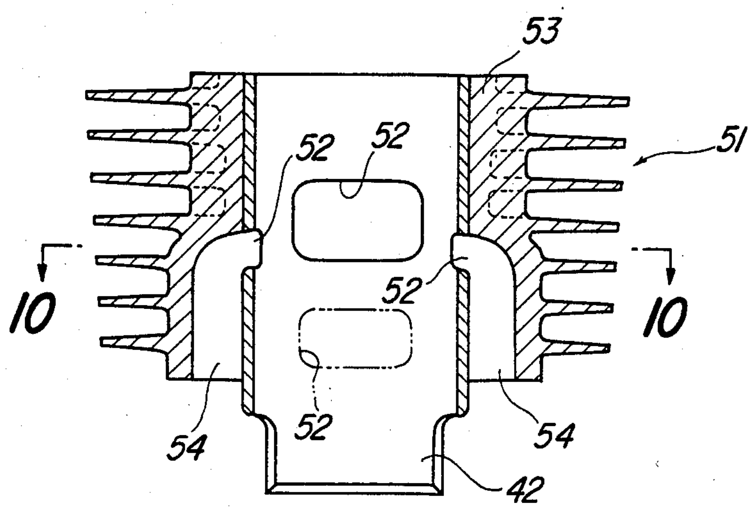
FIG. 9 is a cross-sectional view taken through a cylinder of composite construction employing a cylinder liner formed by an apparatus of the type shown in FIGS. 1 through 8.
Figure 10:
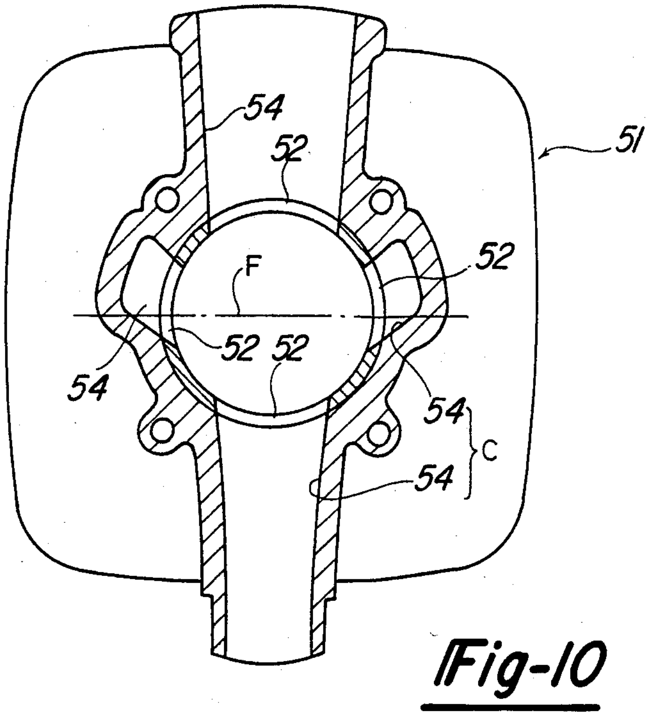
FIG. 10 is a cross-sectional view taken along the line 10—10 of FIG. 9.
Figure 11:
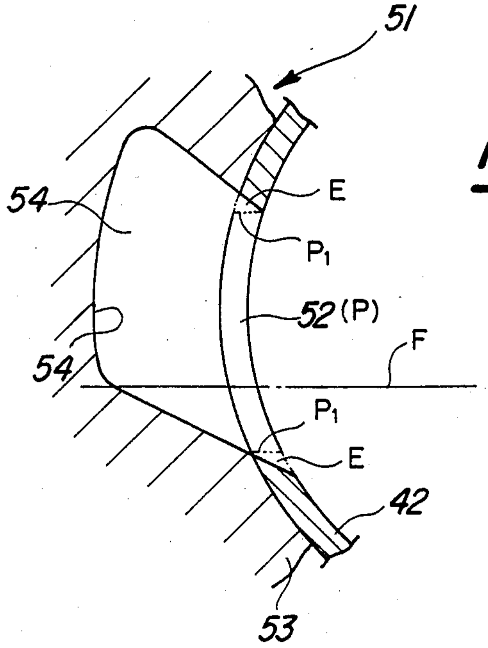
FIG. 11 is an enlarged view through one of the ports showing how it is formed.

Referring first to FIGS. 9 through 11, a composite cylinder assembly embodying a cylinder liner made in accordance with the method is identified generally by the reference numeral 51. The cylinder 51 includes a cylinder liner 42 in which port openings, as indicated by the reference numerals 52, have been formed. The port openings 52 may have any desired angular relationship, as aforenoted, and in this embodiment, these port openings are disposed at 90° to each other or, alternatively, have their centers lying on perpendicular planes whose line of intersection passes through the axis of the cylinder bore.

The cylinder liner 42 is approximately retained in position within the cavity of a mold and a surrounding body of lighter weight material 53, such as a higher silicon content aluminum alloy is cast in place around the liner 42. At the same time, cores are provided that will form the ports 54 of the resulting cylinder block assembly. The ports 54 may serve as either intake or exhaust ports as should be readily apparent to those skilled in the art.

As may be best seen from FIG. 11, which represents an enlargement of one of the port openings and specifically one which intersects a plane F. the ports 54 are angular disposed so that they meet the port openings at an angle to the plane F. Because of the manner in which the port openings 52 are formed, however, the port openings will normally be formed with their edges extending along the radially extending lines $P_1$. In order to provide a smoother port merger into the opening 52, an amount of material, indicated by the reference character E, may be removed from the liner 42 by a suitble chamfering operation such as by grinding or the like.

Figure 13:
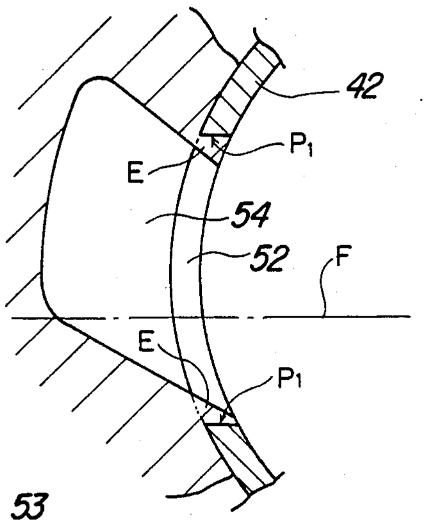
FIG. 13 is an enlarged view of one of the ports of the engine shown in FIG. 12.
Figure 12:
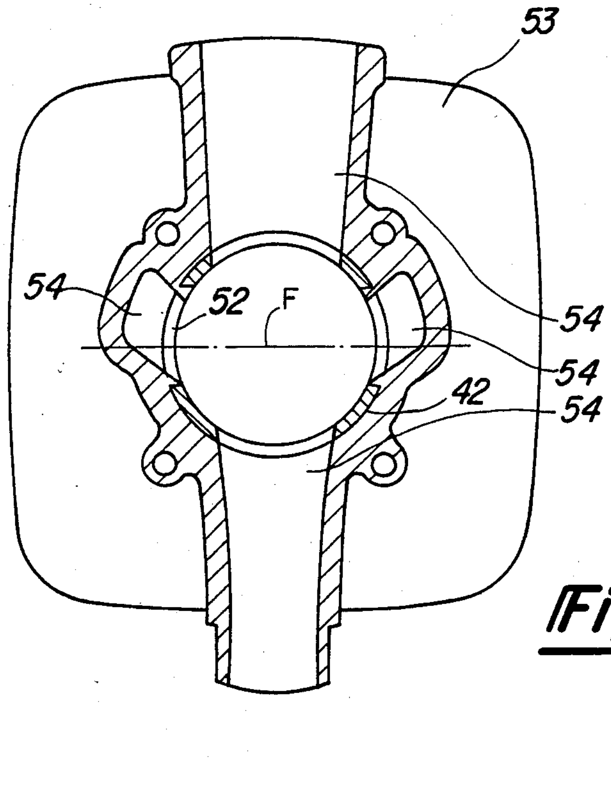
FIG. 12 is a cross-sectional view, in part similar to FIG. 12, showing another method in which the ports may be formed.

FIGS. 12 and 13 show another embodiment wherein the transition between the angularly disposed port of the main cylinder block material 53 and the port openings 52 may be improved without necessitating machining operations. In addition, this embodiment provides a further mechanical interlock between the casting of the cylinder block material 53 and the liner 42. In this embodiment, the port openings formed by the liner material 52 are disposed so that they have a greater extent, as indicated by the line $P_1$, than the actual port opening 52. When the block 52 is cast around the liner 42, a portion of the block material, indicated by the reference character E, will flow into the port opening and provide a mechanical interlock and also the smooth configuration.

It should be readily apparent from the foregoing description that a number of embodiments of the invention have been illustrated and described that permit the convenient forming of a composite cylinder block and in which the port openings of the cylinder liner may be conveniently formed by an improved punching apparatus and wherein the liner may be formed from tubular sections. Although a number of embodiments have been illustrated and described, various other changes and modifications may be made without departing from the spirit and scope of the invention, as defined by the appended claims.

What is claimed is:

1. The method of making a composite cylinder block for an internal combustion engine or the like comprising forming a cylinder liner from a cylinder pipe section, forming at least one port opening in the formed cylinder liner by punching said opening from the inner diameter of said cylindrical pipe section to its outer diameter, and casting at least in part around said cylinder liner a cylindrical block formed from a different material from said cylinder liner.

2. The method as set forth in claim 1 including the step of holding the cylinder liner during the casting process.

3. The method as set forth in claim 2 wherein the opening formed in the liner is larger than the finished port opening and the cast material is cast into the liner opening.

4. The method as set forth in claim 1 wherein the liner is placed on a mandrel having a slidably supported punch for punching the opening and further including a backup die and the step of moving the backup die into engagement with the outer periphery of the liner before the opening is punched.

5. The method as set forth in claim 4 wherein there are a plurality of punches and backup dies and the punches are operated in sequence.

6. The method as set forth in claim 4 wherein the backup dies support a slug ejector and further including the step of retracting the backup die and ejecting the slug by extending the ejector after the punch has been extended and then returning the backup die into engagement with the liner for urging the punch to its retracted position.

* * * * *